US012020842B2

(12) United States Patent
Bang

(10) Patent No.: US 12,020,842 B2
(45) Date of Patent: Jun. 25, 2024

(54) TRANSFORMER

(71) Applicant: Hyundai Electric & Energy Systems Co., Ltd., Seoul (KR)

(72) Inventor: Il-Kwon Bang, Seoul (KR)

(73) Assignee: Hyundai Electric & Energy Systems Co., Ltd., Seoul (KR)

( * ) Notice: Subject to any disclaimer, the term of this patent is extended or adjusted under 35 U.S.C. 154(b) by 876 days.

(21) Appl. No.: 17/041,524

(22) PCT Filed: Dec. 24, 2019

(86) PCT No.: PCT/KR2019/095051
§ 371 (c)(1),
(2) Date: Sep. 25, 2020

(87) PCT Pub. No.: WO2020/139062
PCT Pub. Date: Jul. 2, 2020

(65) Prior Publication Data
US 2021/0012941 A1 Jan. 14, 2021

(30) Foreign Application Priority Data
Dec. 28, 2018 (KR) ........................ 10-2018-0172635

(51) Int. Cl.
*H01F 27/02* (2006.01)
*C22C 38/04* (2006.01)
*H01F 27/32* (2006.01)

(52) U.S. Cl.
CPC ........... *H01F 27/025* (2013.01); *C22C 38/04* (2013.01); *H01F 27/321* (2013.01)

(58) Field of Classification Search
CPC ...... H01F 27/025; H01F 27/321; C22C 38/04
See application file for complete search history.

(56) References Cited

U.S. PATENT DOCUMENTS

2011/0147115 A1* 6/2011 Ertl .......................... H02K 5/24
181/290
2011/0273255 A1* 11/2011 Thompson ............. H01F 27/02
220/652
2015/0077205 A1* 3/2015 Boe .......................... F16J 15/06
336/90

(Continued)

FOREIGN PATENT DOCUMENTS

JP 2006269779 A * 10/2006
JP 4316528 B2 8/2009

(Continued)

OTHER PUBLICATIONS

International Search Report dated Apr. 10, 2020 in corresponding PCT Application No. PCT/KR2019/095051.

*Primary Examiner* — Malcolm Barnes
(74) *Attorney, Agent, or Firm* — Fox Rothschild LLP

(57) ABSTRACT

The present disclosure relates to a transformer. According to an aspect of the present disclosure, a transformer includes a case; a winding portion and an iron core portion, provided in the case; an insulating fluid provided in the case; and a reinforcing portion provided outside the case, and surrounding the case, wherein the reinforcing portion is made of a second material having a yield strength higher than a yield strength of a first material constituting the case, to pressurize the case and prevent expansion of the case.

8 Claims, 7 Drawing Sheets

(56) References Cited

U.S. PATENT DOCUMENTS

| | | | | |
|---|---|---|---|---|
| 2016/0107795 | A1* | 4/2016 | Brodeur | H01F 27/02<br>220/669 |
| 2017/0047154 | A1* | 2/2017 | Liu | H01F 27/02 |
| 2020/0251269 | A1* | 8/2020 | Gonçalves Mendes | H01F 27/02 |
| 2021/0125777 | A1* | 4/2021 | Park | H05K 5/00 |

FOREIGN PATENT DOCUMENTS

| | | | | | |
|---|---|---|---|---|---|
| JP | 2010-212350 | A | | 9/2010 | |
| JP | 2017-017210 | A | | 1/2017 | |
| JP | 2017-117871 | A | | 6/2017 | |
| KR | 10-2013-0076934 | A | | 7/2013 | |
| KR | 10-2015-0067456 | A | | 6/2015 | |
| KR | 20170053437 | A | * | 5/2017 | |
| KR | 10-2017-0126852 | A | | 11/2017 | |
| KR | 10-1966618 | B1 | | 11/2017 | |
| KR | 10-2018-0005057 | A | | 1/2018 | |
| KR | 10-1916220 | B1 | | 11/2018 | |
| WO | WO-2009084792 | A1 | * | 7/2009 | C21D 6/005 |

* cited by examiner

| | High Mn |
|---|---|
| Tensile strength (MPa) | 800 ~ 970 |
| Yield strength (MPa) | 350 |
| Elongation (%) | ≥40 |

FIG. 2

| Steel Material | | | Yield Strength, [MPa] | Tensile Strength, [MPa] | Elongation [%] |
|---|---|---|---|---|---|
| Grade | Standard | Remark | | | |
| SS400 | KS, JIS | Carbon Steel | 245 | ≥ 400 | 18~24 % |
| SM490A | KS, JIS | Carbon Steel | 325 | ≥ 490 | 17~23 % |

FIG.3 wt. % (max)

| C | Si | Mn | P | S |
|---|---|---|---|---|
| 0.5 | 1.2 | 24 | 0.03 | 0.03 |

TRANSFORMER

This application is a national stage of application filed under 35 U.S.C. § 371 of International Application No. PCT/KR2019/095051 filed on Dec. 24, 2019 which claims priority from Korean Application No. 10-2018-0172635 filed on Dec. 28, 2018, in the Republic of Korea. The entire contents of these applications are incorporated herein by reference in their entirety.

TECHNICAL FIELD

The present disclosure relates to a transformer.

BACKGROUND ART

A transformer is a device transforming voltage of alternating current and a magnitude of current by using an electromagnetic induction phenomenon. The transformer may be installed in a power system to play an important role in receiving voltage from a power plant, boosting and reducing the voltage, and transmitting power transformed therefrom to customers.

A typical transformer has a structure in which windings are arranged around an iron core, power is input to one winding, and the power is then output to the other winding.

An insulating fluid may be filled in the transformer to ensure insulation and cooling performance.

However, when an arc is generated in the transformer, a gas bubble may be generated by a chemical action of the insulating fluid and the arc under a relatively high temperature, and an internal pressure of the transformer may increase rapidly.

In this case, the transformer may explode and break, and may cause a serious fire.

Therefore, in recent years, a special pressure discharge device (a rupture disk) or the like has been introduced into the transformer to prevent the risk of explosion and fire in the transformer due to the gas generation and an increase in pressure in the transformer. However, this makes it not only less easy to install the transformer and less easy to maintain the transformer, but also causes problems of high introduction and maintenance costs of the transformer.

(Patent Document 1) KR 10-1916220 B1 (2018.11.01)

DISCLOSURE

Technical Problem

An aspect of the present disclosure is to prevent explosion of a transformer, and to ensure safety of a user and a usage environment.

Another aspect of the present disclosure is to improve efficiency in maintenance of a transformer.

Technical Solution

The present disclosure relates to a transformer.

According to an aspect of the present disclosure, a transformer includes a case; a winding portion and an iron core portion, provided in the case; an insulating fluid provided in the case; and a reinforcing portion provided outside the case, and surrounding the case, wherein the reinforcing portion is made of a second material having a yield strength higher than a yield strength of a first material constituting the case, to pressurize the case and prevent expansion of the case.

In the transformer, the reinforcing portion may include a plurality of stiffeners arranged to be spaced apart from each other and surrounding the case, wherein the stiffeners may be made of the second material, having a tensile strength higher than a tensile strength of the first material.

In the transformer, a minimum value of the tensile strength of the second material may be 1.6 to 2.5 times a minimum value of the tensile strength of the first material.

In the transformer, the stiffeners may be made of high manganese steel.

In the transformer, the second material may have an elongation of 40% or more.

In the transformer, the second material may include, by weight, carbon (C): 0.5%, silicon (Si): 1.2%, manganese (Mn): 24%, phosphor (P): 0.03%, and sulfur (S): 0.03%.

In the transformer, the stiffener may be non-magnetic in entire sections including a flat portion and a bent portion.

In the transformer, the first material may be SS400, and the second material may be high manganese steel.

In the transformer, the first material may be SM490A, and the second material may be high manganese steel.

In the transformer, the stiffeners may be continuously provided in a length direction of the case, and may be arranged to be spaced apart from each other by at least 600 mm in a width direction of the case.

Advantageous Effects

According to the present disclosure, it is possible to prevent an explosion of a transformer, and to ensure safety of a user and a usage environment.

In addition, according to the present disclosure, efficiency in maintenance of a transformer may be improved.

DESCRIPTION OF DRAWINGS

FIG. 2 illustrates physical property values of high manganese steel.

FIG. 3 illustrates physical property values of SS400 and SM490A.

BEST MODE FOR INVENTION

Figure 1:
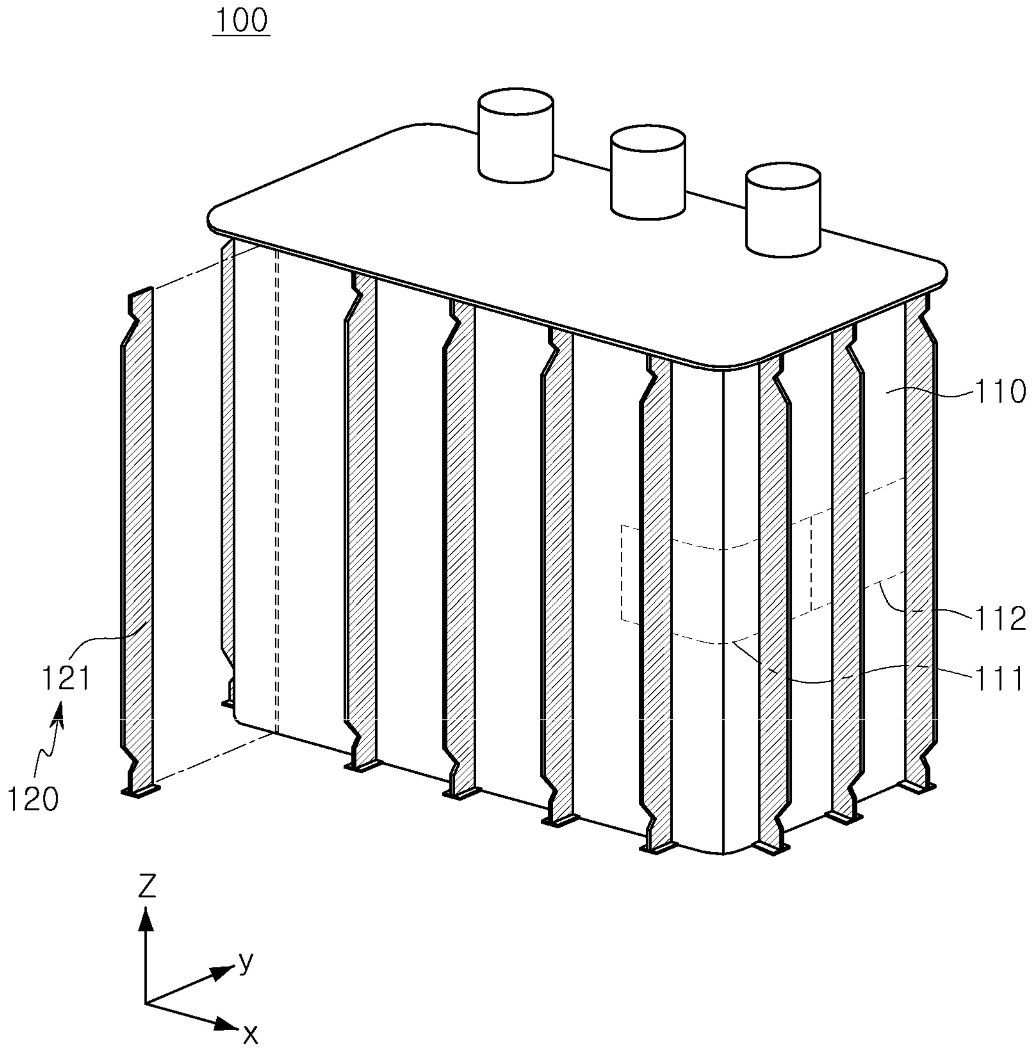
FIG. 1 schematically illustrates a transformer according to the present disclosure.

In order to help understanding of description of embodiments of the present disclosure, an element described with the same reference numeral in the accompanying drawings may be the same element, and a related element among elements that have the same function in each embodiment may be represented by the same number or the number on an extended line.

Further, in order to clarify the gist of the present disclosure, a description of elements and techniques well known by the prior related art will be omitted, and hereinafter, the present disclosure will be described in detail with reference to the accompanying drawings.

However, it is noted that a spirit of the present disclosure is not limited to embodiments presented, but may be proposed in other forms in which specific elements are added, changed, or deleted by those skilled in the art, but may be also included within the scope of the same spirit as the present disclosure.

An X axis illustrated in the accompanying drawings below may refer to a width direction of a case in a transformer, a Y axis may refer to a length direction of the case in the transformer, and a Z axis may refer to a height direction of the case in the transformer.

A transformer described below may be an explosion-proof transformer (a dynamic pressure resistant system, DPRS).

As illustrated in FIG. 1, a transformer 100 according to an embodiment of the present disclosure may include a case 110, and a winding portion 111 and an iron core portion 112 provided in the case 110.

The winding portion may be provided around the iron core in the case 110, which may follow a structure of a conventional transformer.

In addition, the iron core portion and the winding portion as a single unit may be provided in the case 110 as a plurality of units, which may also be appropriately changed and applied according to specifications, standards, usage environments, or the like of the transformer.

An insulating fluid may be filled in the case 110, and a reinforcing portion 120 pressing the case 110 toward a central portion of the case 110 to prevent explosion of the case 110 may be prepared outside the case 110.

The reinforcing portion 120 may include a plurality of stiffeners. The plurality of stiffeners may be continuously provided in circumferential and length directions of the case 110.

The stiffeners may be installed at a predetermined distance from each other in the circumferential direction of the case 110.

In addition, the stiffeners may increase rigidity of the case 110 by acting like rib members, to increase resistance to explosions. Further, the stiffeners may have a material, different from a material of the case 110, to prevent thermal expansion or volume expansion of the case 110, and to prevent explosion of the case 110.

For example, the case 110 may be made of a first material, and the stiffener 121 may be made of a second material having a yield strength higher than a yield strength of the first material. Due to such a difference in yield strength, the rigidity of the case 110 may increase.

As such, when materials having a difference in yield strength are used as materials of the case 110 and the stiffener 121, an explosion of the transformer may be prevented without additional devices or components.

In more detail with respect to the first material and the second material, a tensile strength of the second material, the material constituting the stiffener 121, may be higher than a tensile strength of the first material, the material constituting the case 110.

In an embodiment, the second material may be a material including high manganese steel, and the stiffener 121 may be made of high manganese steel or may be itself.

In the high manganese steel, a value of the tensile strength may be any value in the range of 800 to 970 MPa, a value of the yield strength may be 350 MPa, and an elongation may have a value of 40% or more, as illustrated in FIG. 2.

It can be seen that, when the case 110 is thermally expanded or expanded in volume, the stiffeners 121 made of the high manganese steel may serve to suppress the explosion of the case 110, without breaking within the range of elongation of the high manganese steel, due to the physical properties.

FIG. 3 illustrates values of yield strength, tensile strength, and elongation of SS400 and SM490A, respectively. By comparing the values in those of the high manganese steel, it can be seen that it is relatively efficient to apply the high manganese steel to the stiffener 121.

In this case, the high manganese steel may include, by weight, carbon (C): 0.5%, silicon (Si): 1.2%, manganese (Mn): 24%, phosphor (P): 0.03%, and sulfur (S): 0.03%, as a respective maximum value thereof.

More specifically, a minimum value of the tensile strength of the high manganese steel, the second material, may be 1.6 times or more to 2.5 times or less than a minimum value of the tensile strength of SS400 or SM490A, the first material.

The stiffener (121 of FIG. 1) made of the high manganese steel may be non-magnetic in entire sections. The non-magnetic characteristic may improve performance of the transformer.

Figures 4, 5:
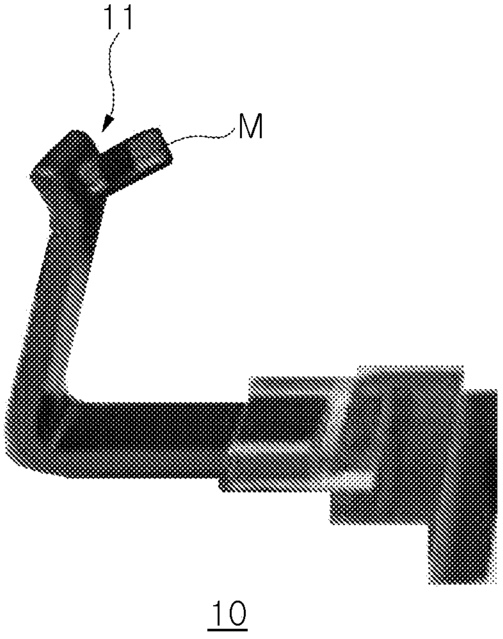
FIG. 4 illustrates maximum weight percentages of high manganese steel.
FIG. 5 illustrates a conventional specimen.

FIG. 5 illustrates a specimen 10 of a conventional SM490A. As illustrated, it can be seen that the specimen 10 includes a magnetic section 11 that may respond to a magnetic body M.

Figure 6:
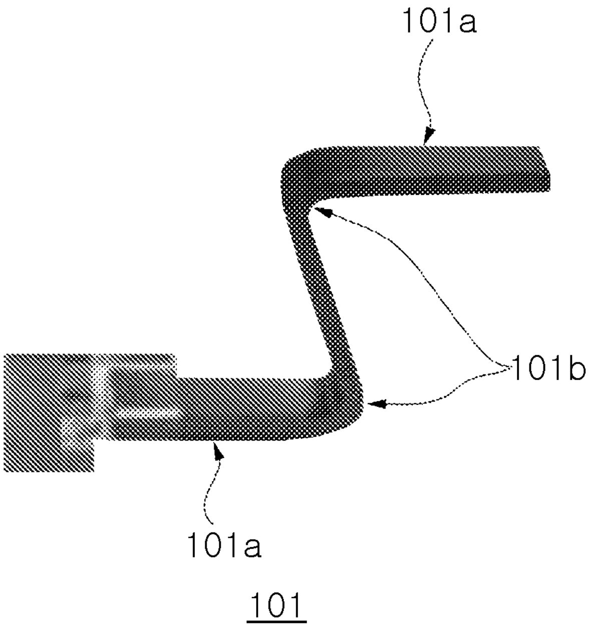
FIG. 6 illustrates a specimen of high manganese steel according to the present disclosure.

A modified specimen 101 made of high manganese steel, as illustrated in FIG. 6, may not respond to the magnetic body (M of FIG. 5), but may be non-magnetic even in a flat portion 101*a*, which may be straight sections, and a bent portion 101*b*, which may be bent sections.

Therefore, such high manganese steel may be applied as the stiffener (121 of FIG. 1) to make the stiffener (121 of FIG. 1) non-magnetic, to improve the performance of the transformer.

Figure 7:
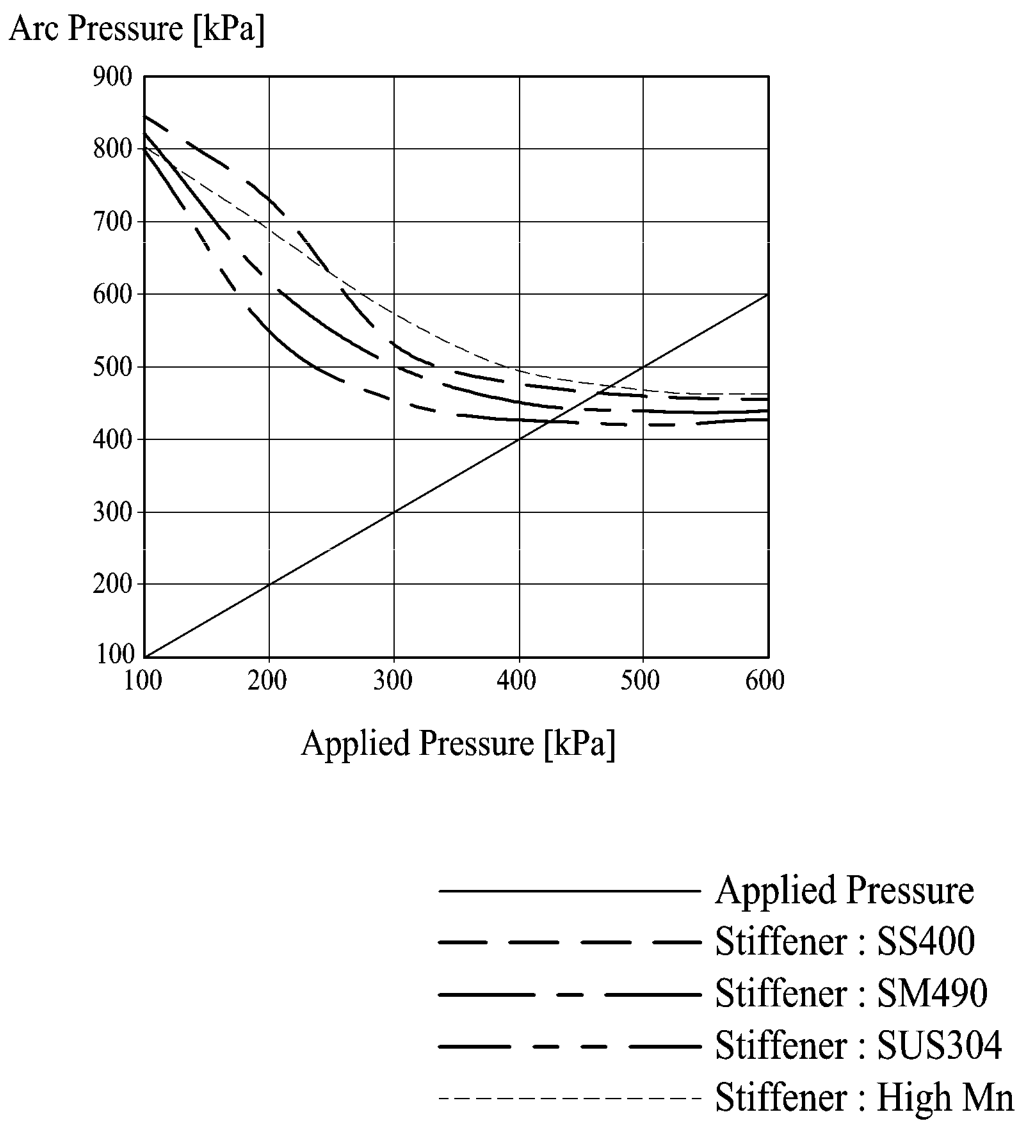
FIGS. 7 and 8 illustrate results of non-linear structural analysis.

FIG. 7 illustrates results of non-linear structural analysis, when a material of the case (110 of FIG. 1) is SS400, and a material of the stiffener (121 of FIG. 1) is changed.

In this case, it can be seen that allowable pressure is the highest, when a material of the stiffener (121 of FIG. 1) is made of high manganese steel (i.e., High Mn).

Figure 8:
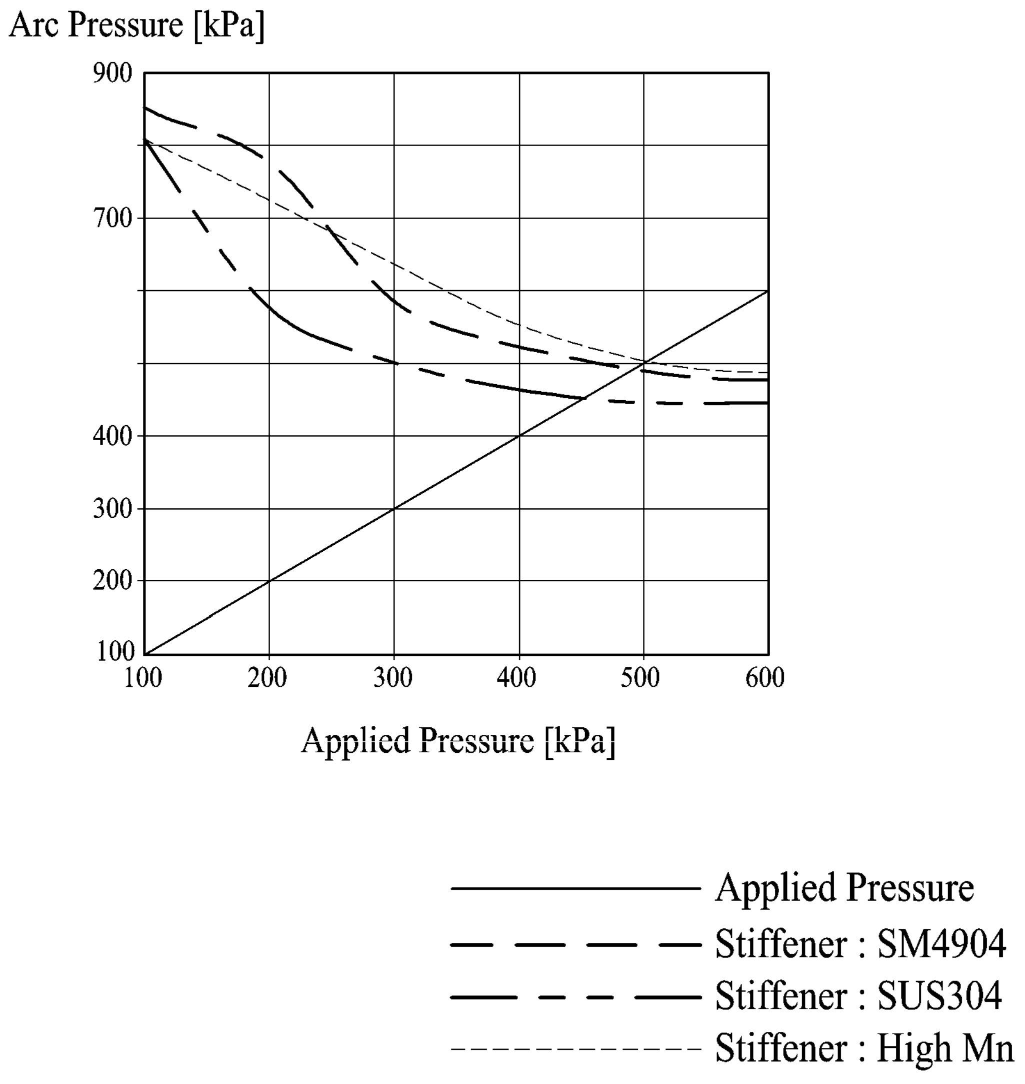

FIG. 8 also illustrates results of non-linear structural analysis, when a material of the case (110 of FIG. 1) is SM490A, and a material of the stiffener (121 of FIG. 1) is changed.

Also in this case, it can be seen that allowable pressure is the highest, when a material of the stiffener (121 of FIG. 1) is made of high manganese steel (i.e., High Mn).

If a material of the stiffener (121 of FIG. 1) is fixed with high manganese steel, allowable pressure in a case in which a material of the case (110 of FIG. 1) is SM490A may be higher than allowable pressure in a case in which a material of the case (110 of FIG. 1) is SS400 (see FIGS. 7 and 8). In consideration of the above, the material of the case may be appropriately selected and used according to specifications, standards, usage environments, or the like of the transformer.

Figure 9:
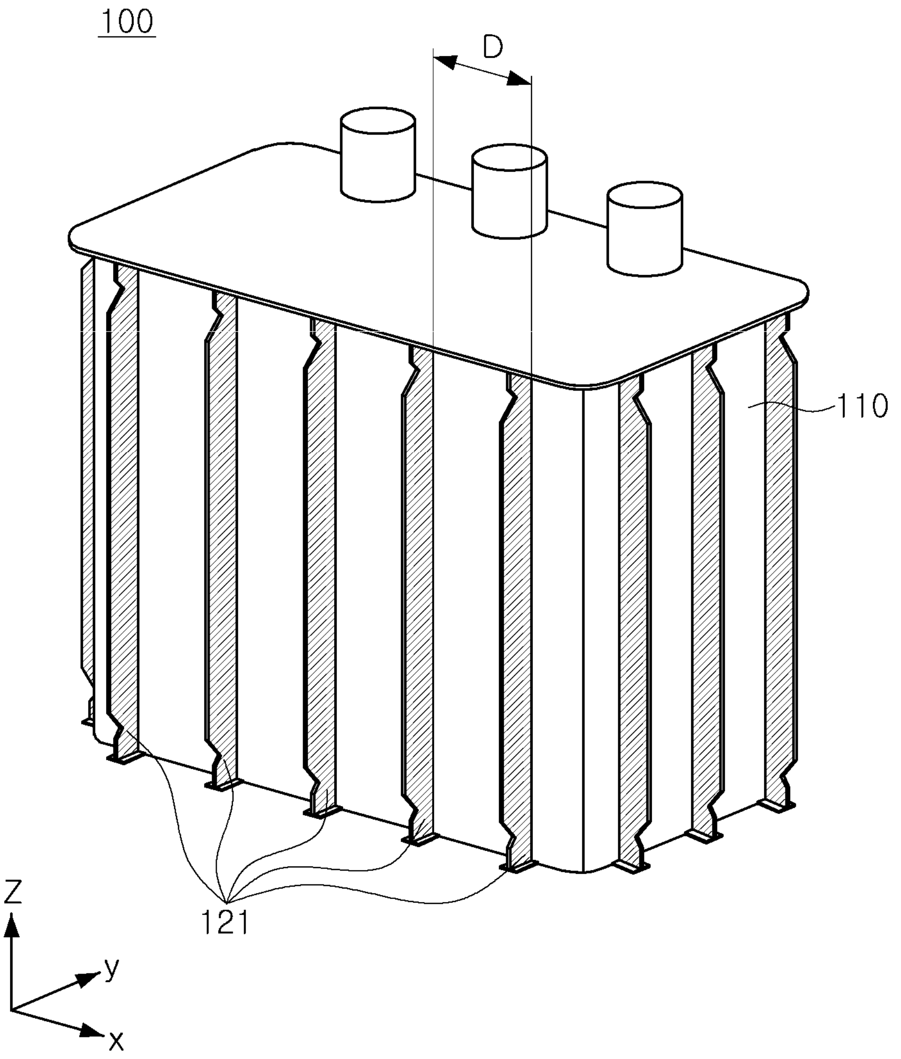
FIG. 9 schematically illustrates a transformer according to the present disclosure.

In addition, as illustrated in FIG. 9, in an embodiment, the stiffener 121 may be continuously provided in a length direction of the case 110, i.e., in a direction, opposite to the Z-axis, and in a width direction (or the circumferential direction) of the case 110, and may be provided to be spaced apart from each other at regular intervals.

In this case, a distance (D) between one stiffener 121 and another stiffener adjacent to the one stiffener may be at least 600 mm.

The distance may be a preferred value that may be applied when a thickness of the first material constituting the case 110 is 9T, a width of the case 110 is 3,000 mm, a length of the case 110 is 1,500 mm, and a height of the case 110 is 2,500 mm. In this case, as standards of the stiffener, a height in a direction, opposite to the Y axis direction, may be 200 mm, and a thickness in the X axis direction may be 15 mm.

According to the above, while minimizing the number of stiffeners and maximizing allowable pressure of the case 110 to improve the explosion-proof performance of the transformer, the production costs may be reduced.

While example embodiments have been illustrated and described above, it will be apparent to those skilled in the art that modifications and variations could be made without departing from the scope of the present disclosure as defined by the appended claims.

The invention claimed is:

1. A transformer comprising:

a case;

a winding portion and an iron core portion, provided in the case;

an insulating fluid provided in the case; and a reinforcing portion provided outside the case, and surrounding the case, wherein the reinforcing portion is made of a second material having a yield strength higher than a yield strength of a first material constituting the case, to pressurize the case and prevent expansion of the case, and wherein a minimum value of a tensile strength of the second material is 1.6 to 2.5 times a minimum value of a tensile strength of the first material, wherein the reinforcing portion comprises a plurality of stiffeners, and the stiffeners are made of high manganese steel.

2. The transformer according to claim 1, wherein the stiffeners are arranged to be spaced apart from each other and surrounding the case, wherein the stiffeners are made of the second material, having a tensile strength higher than a tensile strength of the first material.

3. The transformer according to claim 2, wherein the stiffeners are continuously provided in a length direction of the case, and are arranged to be spaced apart from each other by at least 600 mm in a width direction of the case.

4. The transformer according to claim 1, wherein the second material has an elongation of 40% or more.

5. The transformer according to claim 4, wherein the second material comprises, by weight, carbon (C): 0.5%, silicon (Si): 1.2%, manganese (Mn): 24%, phosphor (P): 0.03%, and sulfur (S): 0.03%.

6. The transformer according to claim 5, wherein the stiffener is non-magnetic in entire sections including a flat portion and a bent portion.

7. The transformer according to claim 1, wherein the first material is SS400, and the second material is high manganese steel.

8. The transformer according to claim 1, wherein the first material is SM490A, and the second material is high manganese steel.

* * * * *